United States Patent
Pous Andrés et al.

(10) Patent No.: US 9,939,816 B2
(45) Date of Patent: Apr. 10, 2018

(54) AUTOMATED INVENTORY TAKING MOVEABLE PLATFORM

(71) Applicant: KEONN TECHNOLOGIES S.L., Barcelona (ES)

(72) Inventors: Rafael Pous Andrés, Barcelona (ES); Ramir De Porrata-Doria I Yagüe, Barcelona (ES)

(73) Assignee: Keonn Technologies S.L., Barcelona (ES)

( * ) Notice: Subject to any disclaimer, the term of this patent is extended or adjusted under 35 U.S.C. 154(b) by 0 days.

(21) Appl. No.: 15/029,200

(22) PCT Filed: Oct. 14, 2013

(86) PCT No.: PCT/EP2013/071412
§ 371 (c)(1),
(2) Date: Apr. 13, 2016

(87) PCT Pub. No.: WO2015/055224
PCT Pub. Date: Apr. 23, 2015

(65) Prior Publication Data
US 2016/0239021 A1    Aug. 18, 2016

(51) Int. Cl.
*G01C 22/00* (2006.01)
*G05D 1/00* (2006.01)
*G05D 1/02* (2006.01)
*G06Q 10/08* (2012.01)
*G06K 7/10* (2006.01)

(52) U.S. Cl.
CPC ........... *G05D 1/021* (2013.01); *G05D 1/0088* (2013.01); *G05D 1/0261* (2013.01); *G06K 7/10366* (2013.01); *G06Q 10/087* (2013.01); *G05D 2201/0216* (2013.01)

(58) Field of Classification Search
USPC .......................................... 701/25
See application file for complete search history.

(56) References Cited

U.S. PATENT DOCUMENTS

| | | | | |
|---|---|---|---|---|
| 4,656,594 A | * | 4/1987 | Ledley | G06K 9/00127 348/26 |
| 5,640,002 A | * | 6/1997 | Ruppert | G06K 7/0008 235/383 |

(Continued)

FOREIGN PATENT DOCUMENTS

WO    2013071150 A1    5/2013

OTHER PUBLICATIONS

International Search Report, PCT Application PCT/EP2013/071412, dated May 8, 2014.

*Primary Examiner* — Jean Paul Cass
(74) *Attorney, Agent, or Firm* — Lowenstein Sandler LLP

(57) ABSTRACT

Moveable platform for taking inventory of objects comprising RFID tags in a storage space, wherein the platform comprises a navigation system, adapted to automatically navigate the platform, and a sensor system, adapted to identify objects to which RFID tags are attached in the storage space, wherein the sensor system comprises at least one antenna, wherein the sensor system is adapted to identify objects in the storage space while the platform moves through the storage space and wherein a control unit is provided that is adapted to control the navigation system in response to information obtained by the sensor system.

13 Claims, 2 Drawing Sheets

(56) References Cited

U.S. PATENT DOCUMENTS

| | | | |
|---|---|---|---|
| 7,693,757 B2* | 4/2010 | Zimmerman | G06Q 10/00 |
| | | | 235/462.11 |
| 7,878,391 B2* | 2/2011 | Kalkhoff | A01K 43/00 |
| | | | 235/98 C |
| 2002/0138181 A1* | 9/2002 | Mori | B60R 16/0231 |
| | | | 701/1 |
| 2002/0165638 A1 | 11/2002 | Bancroft et al. | |
| 2006/0217612 A1* | 9/2006 | Ouchi | A61B 5/024 |
| | | | 600/407 |
| 2008/0024306 A1 | 1/2008 | Bomber et al. | |
| 2009/0021884 A1* | 1/2009 | Nakamura | B51B 3/0059 |
| | | | 361/233 |
| 2009/0143141 A1* | 6/2009 | Wells | G07F 17/32 |
| | | | 463/37 |
| 2013/0001305 A1* | 1/2013 | Fleck | A61G 13/10 |
| | | | 235/385 |
| 2014/0192340 A1* | 7/2014 | Nishikata | G01C 3/02 |
| | | | 356/4.01 |
| 2016/0066759 A1* | 3/2016 | Langhammer | A47L 9/2894 |
| | | | 15/300.1 |

* cited by examiner

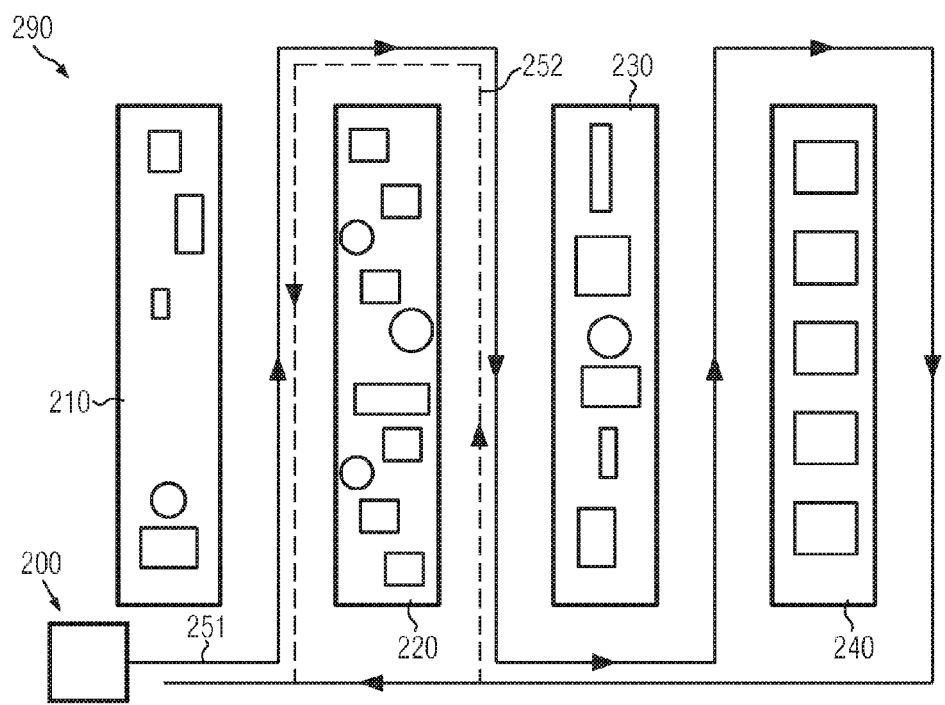
FIG. 2a
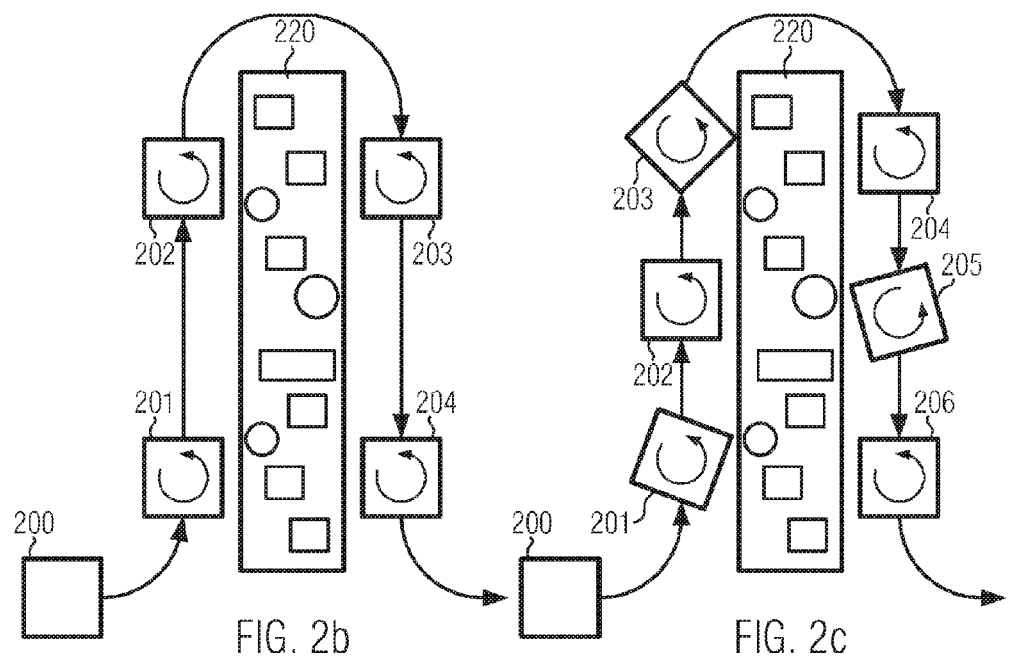
FIG. 2b
FIG. 2c

AUTOMATED INVENTORY TAKING MOVEABLE PLATFORM

The present invention is related to a platform for automatically taking inventory of objects, comprising RFID taps, in a storage space.

TECHNICAL BACKGROUND

Systems for taking inventory are commonly known. For example, handheld devices for manually taking inventory are known that allow a user to accurately take inventory of accordingly marked objects. Here, for example, barcodes and RFID tags are commonly used.

Further, manually navigated robots are known from, for example, U.S. Pat. No. 7,693,757 B2. Here, a system based on barcodes, being decoded by using a camera, is provided that is, at least initially, manually navigated. Further, RFID tags can be use. In order to provide autonomous navigation, tracking transponders are provided on the ceiling and way points on the floor in order to establish the location of the robot.

TECHNICAL PROBLEM

Starting from the prior art, it is an objective of the present invention to provide an autonomous and unassisted inventory taking system with increased accuracy compared to the prior art which, at the same time, requires less input from a manual user or outside control systems.

SOLUTION

This problem is solved by the moveable platform according to independent claim 1 and the method for taking inventory according to claim 8. Preferred embodiments of the invention are disclosed in the dependent claims.

The moveable platform for taking inventory of objects comprising RFID tags in a storage space, according to the invention, comprises a navigation system, adapted to automatically navigate the platform, and a sensor system, adapted to identify objects to which RFID tags are attached in the storage space, wherein the sensor system comprises at least one antenna, wherein the sensor system is adapted to identify objects in the storage space while the platform moves through the storage space and wherein a control unit is provided that is adapted to control the navigation system in response to information obtained by the sensor system. Thereby, an autonomous working system is provided that allows for taking inventory of correspondingly marked objects. As the navigation system navigates the platform through the storage space, depending on obtained information of the sensor system, the platform can ensure that taking inventory is carried out with high accuracy and in a short time period.

In one embodiment, the apparatus is characterized in that the control unit is adapted to control the navigation system such that at least one of the following conditions is fulfilled: an identification efficiency is maximized; the identification rate is adjusted to have a value between a lower limit and an upper limit; the identification rate is always higher than a lower limit; all objects in a given area are identified with a likelihood of at least 99%; the travelled distance and/or the required time is at minimum. Thereby, one or a plurality of the mentioned aims can be fulfilled without requiring further manual input.

In a further embodiment, the sensor system comprises at least two antennas, the antennas being arranged on opposite sides of the platform. This allows for identifying as many objects as possible, while only moving along one specific path.

Further, the apparatus may be characterized in that the sensor system further comprises at least one of a camera, an IR-sensor, a laser ranging sensor, an ultrasound sensor, a collision sensor, a humidity sensor, a light sensor, a temperature sensor, a pressure sensor, a gas sensor, a radiation sensor, a radiofrequency or WiFi sensor, a positioning sensor. Thereby, additional information on the objects that are to be identified can be collected and information on the environmental conditions in the surroundings of the objects can also be provided.

In another embodiment, the apparatus further comprises a processing unit including a dedicated storage unit for storing data, wherein the processing unit is adapted to allocate information on at least one of: a position of an identified object, orientation of such object, image of such object, environmental properties, a current state, physical dimensions of an identified object, readability information of a tag of an identified object to the identified object, strength of the received RFID signal, phase of the received RFID signal, number of times a tag has been identified in a read cycle or in a certain period of time, and the processing unit being further adapted to store obtained information. Thus, existing inventories can be updated or new inventories can be generated automatically.

Still further, the apparatus may be characterized in that the platform further comprises communication means for communicating with an external data processing system. This allows for transmitting the obtained inventory and other information to a work station, for example, and to provide a user with required information on the identified objects.

In accordance with yet another embodiment, the apparatus is characterized in that the platform comprises at least one of a battery, a fuel cell, a photovoltaic cell, an energy harvesting system, adapted to provide energy to the platform. This improves the autonomy of the platform and, thereby, reduces maintenance requirements.

By, for example, utilizing one of the above described apparatuses, a method for taking inventory of a plurality of objects, comprising RFID tags, in a storage space is provided, wherein the method comprises automatically navigating a platform through the storage by means of a navigation system and identifying, by means of a sensor system comprising at least one antenna, objects while the platform navigates through the storage space, wherein the navigation system is controlled by a control unit in response to information obtained by the sensor system. This method provides clear advantages in view of the required time and the accuracy compared to known methods for taking inventory, especially manual inventory taking.

In one embodiment of the method, the control unit adjusts the movement speed and the path along which the platform navigates in response to information obtained by the sensor system. Thereby, the accuracy of the inventory of densely populated storage spaces can be improved and the time required for taking the inventory can be reduced.

In another embodiment, the method is characterized in that obtained information includes at least one of a position of an identified object, orientation of such object, environmental properties, a current state of an identified object, physical dimensions of an identified object, readability information of a tag of an identified object and wherein this information is processed by a processing unit and stored in a dedicated storage. Thus, a complete inventory is provided, or existing inventories can be easily updated automatically.

The method may be further characterized in that the platform transmits obtained information by communication means to an external processing system. Hence, providing the obtained inventory information to, for example, work stations or users that require this information, is feasible.

Still further, the method can be characterized in that the movement of the platform comprises at least one of horizontal angular movement, separate movement of the at least one antenna, movement along a path in at least two different directions. By applying the corresponding movement, the read efficiency of the RFID tags of the objects that are to be identified can be improved, and/or the time for taking the inventory can be reduced.

The method can be further characterized in that one or more antennas of the platform can move and/or rotate horizontally and/or vertically with respect to the platform. By applying the corresponding movement, the read efficiency of the RFID tags of the objects that are to be identified can be improved, and/or the time for taking the inventory can be reduced.

In one embodiment of the method, the control unit controls the navigation system based on obtained information such that one of the following conditions is fulfilled: the identification efficiency is maximized; the identification rate is adjusted to have a value between a lower limit and an upper limit; the identification rate is always higher than a lower limit; all objects in a given area are identified with a likelihood of, for example, at least 99%; the travelled distance and/or the required time is at minimum. By making the platform fulfill at least one of the mentioned conditions, specific requirements of the inventory taking process can be fulfilled and, therefore, the method can be individually applied to specific requirements.

In yet another embodiment, the method is characterized in that the navigation system has information of the actual position of the platform and the position of the at least one antenna and the sensor system has information on the radiation pattern and the read range of the at least one antenna and the processing unit calculates, for each identified object, the position in relation to the platform and/or the position in the storage space. This not only allows for providing the actual information of an identified object but also providing information about the position and/or orientation of such objects, a fundamental improvement with respect to current inventory taking methods.

In one embodiment of the method, it is intended that the sensor system identifies previously identified objects and objects identified for the first time and a counter p for the previously identified objects and a counter f for objects identified for the first time are provided and the control unit controls the navigation system in accordance with the ratio f/(p+f) and/or the ratio p/(f+p). Thereby, the movement of the platform can be adjusted depending on the priority whether to correctly take inventory of new objects or already identified objects.

BRIEF DESCRIPTION OF THE DRAWINGS

FIG. 2 a-c—Schematic depiction of movement paths according to different embodiments

DETAILED DESCRIPTION

Figure 1:
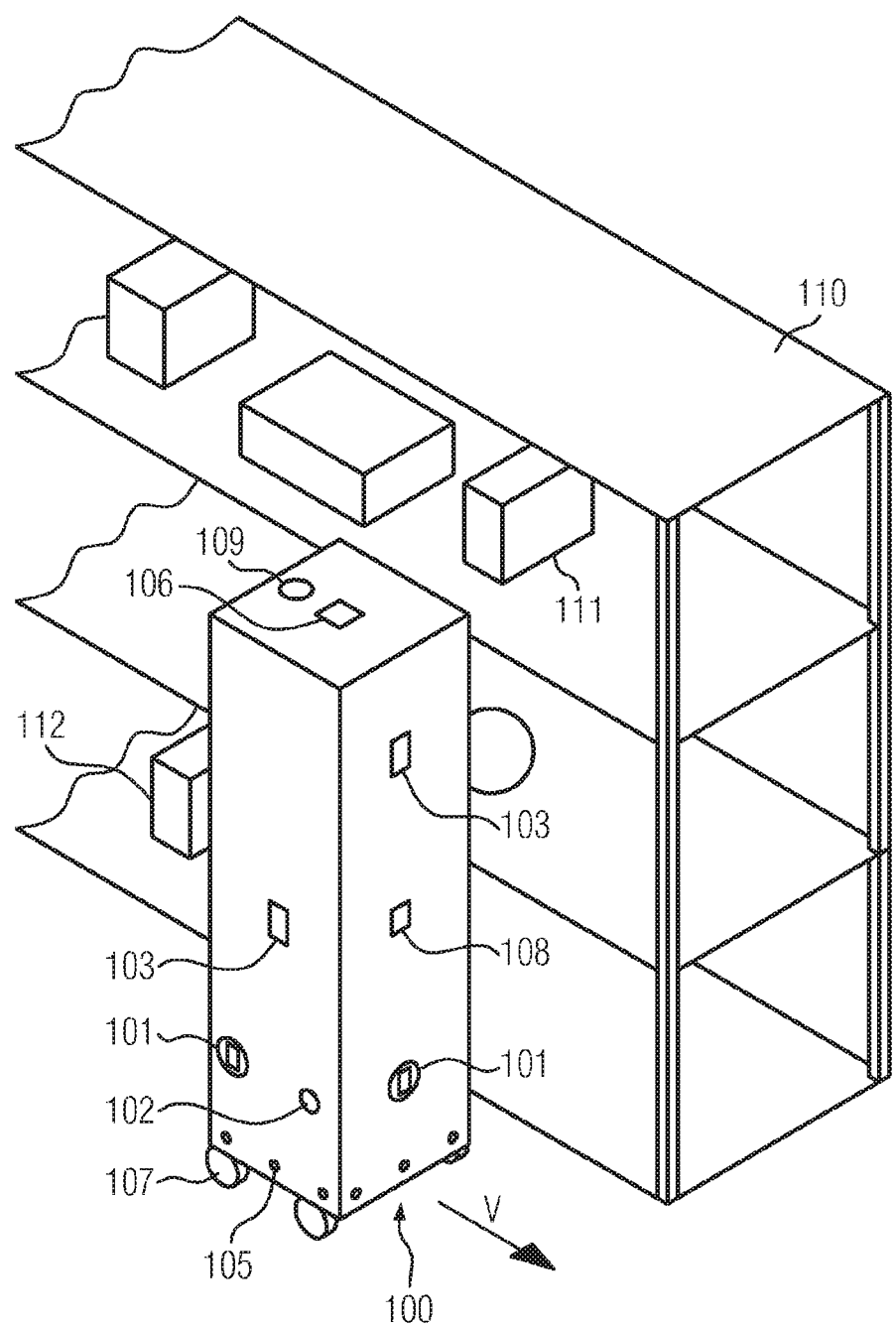
FIG. 1—Schematic description of a moveable platform according to the invention

FIG. 1 shows a moveable platform 100, for taking inventory of a storage space, in accordance with one embodiment of the invention. This platform is provided in the form of a robot. The platform 100 may be of any shape. Depending on the requirements, the platform may be provided in the form of a cuboid or any other regular geometric shape. Further, it might be advantageous to provide the moveable platform with moving means 107, in accordance with the actual terrain on which the platform 100 moves. Therefore, wheels, or chains, or even moveable legs, may be advantageous. If plane undergrounds are provided in a specific storage space in which the moveable platform 100 is to be employed, wheels may be preferred. In order to enhance the mobility of the platform 100, it is preferred that the wheels can be controlled independently of each other. If chains are provided, separate control of the chains is also preferred, in order to ensure the highest flexibility.

In the storage space, shelves (for example) 110 can be provided, in which objects 111 and 112 are stored. The platform 100 is used to identify those objects 111 and 112 while taking inventory. In order to achieve this, the objects are preferably provided with RFID tags. For identification of the object, the moveable platform 100 comprises a sensor system. This sensor system can comprise a plurality of different sensors but preferably includes at least one antenna 101, adapted to read and identify RFID tags. In one embodiment, there may be only one antenna which might be provided on top of the moveable platform 100 or at the front side. In other embodiments, more than one antenna 101 may be provided. In a preferred embodiment there are at least two antennas that are provided on opposite sides of the moveable platform 100. In order to provide preferably high identification accuracy of the objects 111 and 112, those antennas are provided on each side of the platform 100, such that they face (for example) the shelf 110.

In addition to the antennas that provide the identification of the RFID tags, it can be advantageous to provide further sensors in the sensor system. This means that the platform may further comprise one or more cameras 103. These cameras allow for optical identification or inspection of the objects 111 and 112 in the shelves. In order to achieve this, it might be advantageous to turn on the cameras for the whole time that the moveable platform is employed. However, it might also be possible that the cameras are only turned on if specific objects are identified that require further optical information, for example on their present state (color or surface structure). Moreover, in order to ensure safe movement of the moveable platform within the storage space, collision sensors 105 may be provided. These collision sensors are preferably provided in the lower part of the platform 100, in order to ensure recognition of any item that might be in front of the platform 100 and blocking its way. Furthermore, collision sensors may be provided in the upper part of platform 100, in order to ensure that no items that bridge the path of the platform 100 are ignored, potentially causing the platform to collide with such items.

On top of this, it might be advantageous to obtain further information on the environmental conditions, or the conditions of objects 111 and 112. Therefore, for example, humidity sensors 102, light sensors 106, temperature sensors 108, or radiation sensors 109, may be provided. Although any sensors might be suitable to provide some information on the corresponding measured entities like temperature or humidity, it is preferred that the corresponding information has a directional component, i.e. that the sensors provided for measuring the respective values are directional sensors, giving information on the direction or the position in which the corresponding value is measured. This is especially important for example in view of the radiation sensor, in order to identify radiation sources and their specific radiation. Even other sensors may be employed in order to facilitate the collection of as much information as possible during an inventory taking cycle.

While the collection of the data is achieved by the sensor system in general, the platform 100 may further comprise a navigation system that may be provided as including or only acting on the motors and, for example wheels, in order to move the moveable platform 100 through the storage space. This navigation system may also comprise logic for planning movement paths based on previously stored maps of the storage space. Still further, a control unit may be provided in the platform 100 that allows for independent inventory taking. This means that few, or preferably no input from outside, i.e. a user or controller or other entities like computers, is necessary for the inventory process to be carried out by the platform. In order to achieve this, the control unit is adapted to control the navigation system, based on the data obtained during the inventory process. This means that the control unit is connected, preferably in a bidirectional way, to the sensor system and the navigation system, such that it can exchange instructions and information with said systems. In a preferred embodiment, the control unit uses the information collected by the sensor system to control the navigation system, thereby controlling the movement of the platform. Still further, the control unit may also use the information obtained by the sensor system in order to adjust the sensor system itself, i.e. turning on or off specific sensors or carrying out diagnosis on the sensors. This control of the sensors and/or the navigation system will be described later, in detail. It is appreciated that the control system may include the navigation system, i.e. that these systems may be employed in one single hardware component.

Further, the platform 100 may comprise an integrated processing unit, including a dedicated storage. This processing unit may be incorporated in the control unit, or may be provided in the form of a separate system in the platform 100. The processing unit may be used not only to store obtained data but also to process the obtained data in order to obtain additional information. For example, the processing unit can be used to connect the information obtained by the independent sensors of the sensor system based on different requirements. For example, the processing unit may summarize all information obtained by the different sensors of the sensor system that is related to one specific object 111 or 112. In more detail, the processing unit may summarize information related to the specific object, i.e. the position, the orientation, the image, the current state, and the physical dimensions of an identified object, as well as environmental properties of the storage space in which the object is placed, readability information of the RFID tag of the identified object, strength of the received RFID signal, phase of the received RFID signal and number of times a tag has been identified in a read cycle or in a certain period of time. This information may than be stored in the dedicated storage, such that one data structure for each identified object is generated. The processing unit may further update this information during future inventory processes, or may delete this information as soon as the object is no longer in the storage space. Moreover, the processing unit may use information on single objects 111 and 112, in order to derive information on an entirety of objects. For example, the processing unit may be adapted to provide a map, on which the density of identified objects is shown, including information on the kind of objects or on only, for example, the shelf on which corresponding objects are situated. For example, if there are only two different types of object that are stored in the storage space, the processing unit may color the areas on the map on which one kind of object is stored in one color, and those on the map of the storage space in which the other kind of object is stored in a different color. Further, information on the number of objects stored in the storage space can be provided by the processing unit.

In order to further enhance the mobility of the platform 100, an independent energy supply in the form of batteries, fuel cells, photovoltaic cells, or an energy harvesting system that may collect energy from an employed electromagnetic field or any other source may be provided in the platform. Thereby, recharging times can be reduced and the inventory taking can be carried out at any time.

With reference to FIG. 2, the movement of the platform 200 will be described in more detail in view of inventory taking procedures.

In FIG. 2, an example of a storage space 290 is shown, including four shelves 210, 220, 230, and 240, on which objects are stored. The task of the platform 200 is to inventory preferably all objects stored in the storage space 290. Therefore, the platform 200 may start by moving along path 251. It, therefore, first passes shelves 210 and 220. By doing so, the activated sensors may collect information on the items stored on the shelves 210 and 220. Preferably, the antennas described in FIG. 1, which are responsible for identifying the objects by their RFID tags, are always activated when the platform 200 carries out an inventory process. Therefore, at least some of the objects stored in the shelves 210 and 220 are identified by these sensors. It is preferred that the respective antennas are even activated while the platform 200 moves. Thereby, relative movement between the RFID tags, in the objects stored on the shelves, and the antenna, provided on the platform, is achieved, which reduces the likelihood of blind spots occurring during the inventory taking process, which would result in objects not being identified. Hence, by collecting information on the objects stored in the shelves 210 and 220, the platform 200 has already obtained considerable information on these objects. However, depending on the velocity at which the platform 200 moves along the shelves 210 and 220, and depending on the frequency with which read processes of the RFID takes place, there may be a chance that the platform 200 does not identify all objects stored on the shelf 220, which is shown here as being more densely populated than shelf 210. The control unit described in FIG. 1 may conclude from the number of objects identified so far on shelf 220 that there is a chance that some objects were not yet identified. Depending on this chance, the movement of the platform 200 may be adjusted, as will be described later. First of all, in this embodiment, the platform 200 proceeds by taking inventory of the remaining shelves 230 and 240. It is noted that this is only one option. The platform could likewise continue the inventory of the shelf 220 until this is finished and then proceed further to shelves 230 and 240.

When the inventory process is finished, the platform 200 may return to its origin. However, as described above, the control unit may have recognized that there is a chance that objects on the shelf 220 were not yet identified. Therefore, before returning to its origin, the platform 200 travels along shelf 220 again on path 252, shown as a dashed line in FIG. 2a. This second movement along shelf 220 may be carried out with a different movement profile, as shown in FIGS. 2b and 2c, or may be carried out with the same movement profile in order to reduce the likelihood of objects not being identified in the shelf 220. Independent of the movement profiles described in FIGS. 2b and 2c, the platform 200 may move along path 252 around shelf 220 in a distance and/or at an angle different from the distance corresponding to the previous path 251 and/or different from the previous angle corresponding to the previous path 251. By altering the distance and/or angle with respect to shelf 220, blind spots on path 251 can be avoided, thereby increasing the identification efficiency and reducing the likelihood of objects not being identified. After this second movement along the shelf 220, the control unit may again decide whether the likelihood of objects not being identified in shelf 220 is so small that the inventory taking process can be finished or the control unit may decide that obtaining information of shelf 220 is still required.

Depending on specific aims that are to be achieved, or conditions that are to be fulfilled, the control unit may control the navigation system in order to realize a specific movement pattern. Those goals, or conditions, may be to maximize identification efficiency, or an identification rate being adjusted to have a value between a lower limit and an upper limit, or an identification rate that is at least always higher than a lower limit. There might be the condition to identify all objects in a given area, with a likelihood of, for example, at least 99% or more, or to reduce the travel distance of platform 200 or the required time for carrying out the inventory taking process to a minimum. Depending on these conditions, the control limit may increase or decrease the velocity of the platform 200 or it may alter the movement path along which the platform 200 moves through the storage space, or it may power up or shut off specific sensors of the sensor system, like additional antennas.

With reference to FIG. 2b, one example of a modified movement of platform 200 shown in a case where the identification efficiency is to be maximized. In order to achieve this, the control unit may activate at least two, preferably all, antennas of the platform 200. Further, the control unit may cause the navigation system to stop the movement of the platform 200 at specific positions 201, 202, 203, and 204. At these positions, the control unit may cause the navigation system to start a full or at least a partial rotation of the platform. This rotation allows for eliminating blind spots which would cause failure of the identification of some objects. However, this significantly increases the time required to complete an inventory taking process. Although, on the other hand, the identification efficiency is maximized with respect to the number of identified objects stored on the shelf 220 provided here. Thus, as the control unit is programmed to fulfill the condition that the identification efficiency is maximized, the control unit will modify the movement of the platform 200, without taking into account the required time, but only focusing on the identification efficiency. The control unit may, therefore, adjust the distance between the intermediate stops 201, 202, 203, and 204 in order to further maximize the identification efficiency. For example, if the obtained information shows that there are a lot of blind spots, the control unit sets the distance between the intermediate stops of the platform 200, such that it is 5 m, 4 m, 3 m, 2 m, 1 m, or only 50 cm. Further, in some cases, it might be sufficient to only carry out a half rotation, whereas in other cases, a full rotation of the platform 200 is required. In view of this, it is noted that any rotation angle may be employed which is between 0° and a full rotation of 360°. The control unit may even cause the navigation system to adjust the rotational speed by which the rotation is carried out. This is the case, for example, when the main condition that is to be fulfilled is the maximization of the identification efficiency but only if the inventory taking process does not take longer than a given time (secondary condition). In this case, the control unit may calculate under which circumstances the best identification efficiency can be achieved in the given time limit. Other combinations of conditions may also be provided that are to be fulfilled.

Additionally or alternatively, the control unit may make one or more antennas of the platform 200 move and/or rotate with respect to the platform, either in a case where the identification efficiency is to be maximized or in a case where, given a desired identification rate, the scan time of the platform 200 is to be minimized.

A further embodiment of the movement of the platform 200 is shown in FIG. 2c. Here, the conditions that are to be fulfilled may be different from those underlying the movement in FIG. 2b, For example, the condition that is to be fulfilled in the example shown in FIG. 2c may be to adjust the identification rate such that it has a value between a lower limit and an upper limit. In order to achieve this, the control unit may control the navigation system, such that during the movement along the given movement path, a rotation is carried out over a specific angle. However, in this embodiment, the platform 200 does not stop its translational movement before or while rotating, but rotates while moving. As rotation of the platform 200 reduces the amount of blind spots, even while the platform moves, the degree of rotation, i.e. the angular velocity, may be adjusted in real time, such that the estimated or calculated identification rate has a value between a lower limit and an upper limit. A minimum angular velocity of the rotation can be provided by the control unit, if the condition that is to be fulfilled is to provide an identification rate that is always higher than a lower limit. It is noted that the identification rate described here corresponds to a number of objects being identified within a specific time limit. Therefore, not only the angular velocity of the rotation of the platform 200 may be adjusted by the control unit but also the velocity of the translational movement may be adjusted by the control unit.

One of the conditions to be fulfilled could be to provide identification of all objects in a given area, for example in shelf 220, with a likelihood of a given percentage, for example at least 99%. In order to fulfill this condition, the control unit may cause the navigation system to travel along shelf 220 as long as only a specific amount, for example 5, further objects are identified during each further movement along the shelf 220. If few or no further objects are identified, the control unit may cause the navigation system to finish its movement around the shelf 220 and to return to the origin of the platform 200, for example to recharge.

In addition to the above mentioned conditions, it might also be advantageous to provide the platform 200 with the ability to distinguish between previously identified objects and objects that are identified for the first time. Let the numbers of previously identified objects p and the number of objects identified for the first time be f. In this case, the number n of objects that are present within the storage space is n=p+f. As it might be of high interest for the proprietor of the storage space to obtain information on newly identified objects, the movement of the platform may be controlled depending on the ratio f/p+f or p/p+f. For example, if the first ratio is greater than 0.5, it can be assumed that more than half of the objects stored in the storage space were identified for the first time. In such a case, the conditions that are to be fulfilled may be to maximize the identification efficiency and to identify preferably all objects stored in the storage space.

In order to achieve this, the control unit may calculate a preferred velocity with which the platform travels along the storage space, for example shelf 220. This velocity may be calculated by multiplying a minimum velocity v with n divided by f. This results in a velocity of the platform that is high, if no or almost no new objects are in the storage space, and is comparably low (with respect to the minimum velocity) or equal to the minimum velocity if almost all objects stored in the storage space are new. By allowing the control unit to adjust the movement of the platform such that the ratio between objects identified for the first time and the overall amount of objects in the storage space has a significant influence, the inventory process becomes more flexible. This also improves the results of the inventory taking compared to known technologies that provide automated inventory taking.

Further, as the platform or the sensor system is adapted to calculate the exact positions and/or orientations of the objects stored in the storage space, the platform may not only provide information on the objects but is also capable of creating a map of the storage space that the platform can use in order to improve the efficiency of the inventory process. This means that, for example, the platform can use the generated map that may also include information on the density of stored objects in specific areas of the storage space to improve its route, as shown for example in FIG. 2a, in view of one or more conditions. For example, if the condition is to minimize the travelled distance, the control unit may calculate, from the obtained map, including the already obtained object information, for example the density of stored objects in specific areas, the most efficient way for taking the inventory by also taking into account the inventory taking of the areas in which the objects are stored in a highly dense manner. Thereby, indirect routes can be avoided that a human worker may take, which would increase the time required to take the inventory.

The invention claimed is:

1. A moveable platform comprising:
a navigation system, to automatically navigate the moveable platform;
a sensor system comprising at least one antenna, the sensor system to:
identify, while the moveable platform moves through a storage space in a first instance, a first set of objects to which first RFID tags are attached and that are in a first set of locations in the storage space; and
identify, while the moveable platform moves through the storage space in a second instance subsequent to the first instance, previously identified objects and objects identified for a first time, wherein identifying the previously identified objects comprises identifying the first set of objects in the first set of locations in the second instance, wherein the objects identified for the first time comprise a second set of objects to which second RFID tags are attached and that are in a second set of locations in the storage space, and wherein a counter p is provided for the previously identified objects and a counter f is provided for the objects identified for the first time; and
a control unit, connected to the navigation system and to the sensor system, to control the navigation system in response to information obtained by the sensor system, wherein the control unit is to:
determine at least one of a first ratio $f/(p+f)$ or a second ratio $p/(f+p)$, wherein the at least one of the first ratio or the second ratio is a numerical value; and
control the navigation system in accordance with the at least one of the first ratio or the second ratio such that at least one of the following conditions is fulfilled:
an identification efficiency is maximized;
an identification rate is adjusted to have a value between a lower limit and an upper limit;
the identification rate is always higher than the lower limit;
all objects in a given area are identified with a likelihood of at least 99%;
a travelled distance is at a minimum; or
a required time is at minimum.

2. The moveable platform of claim 1, wherein the sensor system comprises at least two antennas, the at least two antennas being arranged on opposite sides of the moveable platform.

3. The moveable platform of claim 1, wherein the sensor system further comprises at least one of a camera, an IR-sensor, a laser ranging sensor, an ultrasound sensor, a collision sensor, a humidity sensor, a light sensor, a temperature sensor, a pressure sensor, a gas sensor, a radiation sensor, a radiofrequency sensor, a Wi-Fi sensor, or a positioning sensor.

4. The moveable platform of claim 1, further comprising:
a processing unit including a dedicated storage unit for storing data, wherein the processing unit is to allocate and store information on at least one of:
a position of an identified object, an orientation of the identified object, an image of the identified object, environmental properties, a current state of the identified object, physical dimensions of the identified object, readability information of an RFID tag of the identified object, a strength of an RFID signal received from the RFID tag on the identified object, a phase of the received RFID signal, or a number of times the RFID tag has been identified in a read cycle or in a certain period of time.

5. The moveable platform of claim 1, wherein the control unit is further to communicate with an external data processing system.

6. The moveable platform of claim 1, further comprising an energy source to provide energy to the moveable platform, wherein the energy source comprises at least one of a battery, a fuel cell, a photovoltaic cell, or an energy harvesting system.

7. A method comprising:
automatically navigating a moveable platform through a storage space by a navigation system of the moveable platform;
identifying, by a sensor system of the moveable platform comprising at least one antenna, a first set of objects in a first set of locations in the storage space while the moveable platform navigates through the storage space in a first instance, wherein the first set of objects are identified based on first RFID tags of the first set of objects; and
identifying, by the sensor system while the moveable platform navigates through the storage space in a second instance subsequent to the first instance, previously identified objects and objects identified for a first time, wherein the identifying of the previously identified objects comprises identifying the first set of objects in the first set of locations in the second instance, wherein the objects identified for the first time comprise a second set of objects to which second RFID tags are attached and that are in a second set of locations in the storage space;
providing a counter p for the previously identified objects and a counter f for the objects identified for the first time;

determining at least one of a first ratio $f/(p+f)$ or a second ratio $p/(f+p)$ in response to information obtained by the sensor system, wherein the at least one of the first ratio or the second ratio is a numerical value; and controlling the navigation system by a control unit in accordance with the at least one of the first ratio or the second ratio such that at least one of the following conditions is fulfilled:

an identification efficiency is maximized;

an identification rate is adjusted to have a value between a lower limit and an upper limit;

the identification rate is always higher than the lower limit;

all objects in a given area are identified with a likelihood of at least 99%;

a travelled distance is at a minimum; or a required time is at a minimum.

8. The method of claim 7, further comprising:

adjusting, by the control unit, a movement speed of the moveable platform and a path along which the moveable platform navigates in response to the information obtained by the sensor system.

9. The method of claim 7, wherein the information includes at least one of a position of an identified object, an orientation of the identified object, an image of the identified object, environmental properties, a current state of the identified object, physical dimensions of the identified object, readability information of an RFID tag of the identified object, a strength of a received RFID signal from the RFID tag of the identified object, a phase of the received RFID signal, or a number of times the RFID tag has been identified in a read cycle or in a certain period of time, the method further comprising:

processing the information by a processing unit; and storing the information in a dedicated storage.

10. The method of claim 7, further comprising:

transmitting, by the moveable platform, the information to an external processing system.

11. The method of claim 7, wherein automatically navigating the moveable platform through the storage space comprises performing at least one of horizontal angular movement of the moveable platform, separate movement of the at least one antenna, or movement of the moveable platform along a path in at least two different directions.

12. The method of claim 9, wherein the navigation system has additional information of an actual position of the platform and a position of the at least one antenna and the sensor system has further information on a radiation pattern and a read range of the at least one antenna, the method further comprising:

calculating by the processing unit, for each identified object, at least one of a position of the identified object in relation to the moveable platform, an orientation of the identified object in relation to the moveable platform, the position of the identified object in the storage space, or the orientation of the identified object in the storage space.

13. The method of claim 7, further comprising: causing the at least one antenna in the moveable platform to at least one of a) move with respect to the moveable platform or b) rotate with respect to the moveable platform.

* * * * *